(Model.)
S. TOLES.
SAW.
No. 249,119. Patented Nov. 1, 1881.
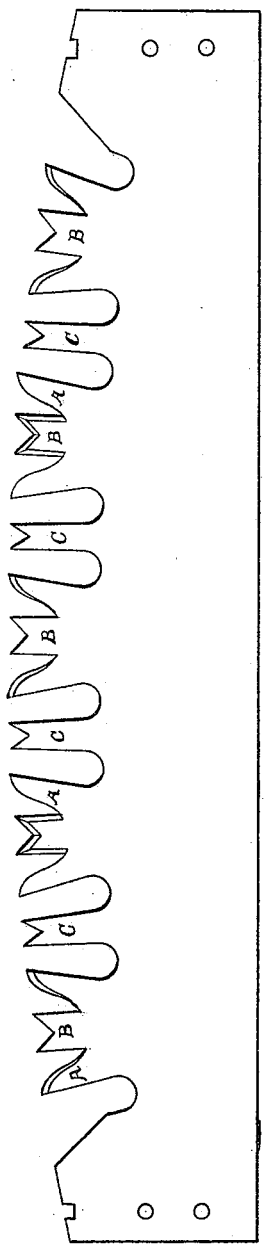
Witnesses
Edwin Ware
A. W. Campbell
Inventor
Silas Toles

UNITED STATES PATENT OFFICE.

SILAS TOLES, OF ST. THOMAS, ONTARIO, CANADA, ASSIGNOR TO CHARLES E. STILL, OF SAME PLACE.

SAW.

SPECIFICATION forming part of Letters Patent No. 249,119, dated November 1, 1881.

Application filed December 27, 1880. (Model.) Patented in Canada November 5, 1878.

*To all whom it may concern:*

Be it known that I, SILAS TOLES, a subject of Great Britain, residing at St. Thomas, county of Elgin, in the Province of Ontario and Dominion of Canada, have invented a new and useful Improvement in Saws, of which the following is a full, clear, and exact description, reference being had to the accompanying drawing, forming part of this specification.

My invention relates to improvements in saws in which the teeth are arranged in groups; and my improvement consists in constructing groups of three teeth each of peculiar shape, alternating with clearers, as hereinafter described.

The figure in the accompanying drawing represents a side view of a saw constructed according to my improvement, in which—

B is the central tooth of each group, having on each side a curved beveled-faced tooth, A, inclined at an angle from the central tooth. The tooth B has a notched face, and its edges are beveled on the side opposite to the beveled edges of teeth A, which two are always beveled alike, and in each successive group the inclination of the bevels is reversed respectively, the set of the teeth corresponding therewith. Between each two successive groups is a straight clearer, C, having a notched face, and being without bevel, while the intervening spaces on each side of it are curved out, so as to form enlarged recesses for receiving and discharging the cut fiber from the kerf. The clearers C are made without set in order that they may cut out the central rib left between the cuts of teeth A and B.

Having thus described my invention, what I claim as new, and desire to secure by Letters Patent, is—

A saw having groups of three teeth each, in which the central tooth, B, has a notched beveled face, and the teeth A A, which are set and beveled in the opposite direction, have curved faces and are inclined from the central tooth, the intervening spaces being curved out at the sides and provided with central clearers, substantially as shown and described.

SILAS TOLES.

Witnesses:
EDWIN WARE,
JAS. A. BELL.